Patented July 23, 1946

2,404,510

UNITED STATES PATENT OFFICE 2,404,510

HYDANTOINS AND METHODS OF OBTAINING THE SAME

Loren M. Long, Detroit, Mich., assignor to Parke, Davis & Company, Detroit, Mich., a corporation of Michigan No Drawing. Application September 25, 1944, Serial No. 555,759

8 Claims. (Cl. 260—309.5)

The invention relates to a new class of chemical compounds which are valuable for therapeutic use, especially as anticonvulsants having relatively high anticonvulsant activity combined with low toxicity.

The compounds of the invention have the general formula,

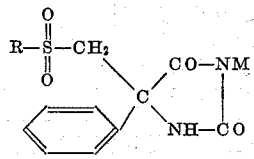

where R is a straight, branched, or cyclic alkyl radical or an aryl or aralkyl radical such that the total number of carbon atoms in R is not more than 7. M of this formula represents a member of the class hydrogen and basic elements or groups forming non-toxic salts of the hydantoins, such as sodium, calcium, magnesium, ammonium and substituted ammonium, for example, mono- and di-alkyl ammonium and corresponding hydroxy alkyl ammonium.

The compounds of the invention can be used orally or by injection. For example, the average adult person can start with a dosage of ½ to 1 gram per day orally and increase the dosage slightly thereafter. The compounds are without odor when properly purified.

The compounds of this invention are readily prepared by oxidizing the corresponding sulfide compounds. The sulfides are made by reacting the corresponding ketone intermediates of the formula,

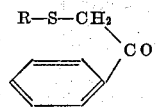

where R has the same significance as in the formula given above for the final products, with an alkaline, water-soluble cyanide and aqueous ammonium carbonate or the like combination consisting of, or capable of generating, ammonia, carbon dioxide, and water, acidifying the reaction mixture, and separating the hydantoin. In spite of the alkaline conditions used, I have found that the sulfide linkage of the intermediate ketones goes through the reaction to give my new hydantoins with substantially no change. The intermediate ketones are, in most cases, prepared by the action of the sodium salt of the appropriate mercaptan on phenacyl chloride (T. C. Whitner, Jr., and E. E. Reid; J. A. C. S. 43, 638 (1921)). They may also be prepared by the reaction of an acid chloride of the formula,

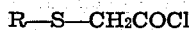

where R has the same significance as in the formula given above for the final product, with benzene in the presence of anhydrous aluminum chloride.

After the sulfide substituted hydantoins have been made they are oxidized at the sulfide linkage to the corresponding sulfones. This may be done by means of oxidizing agents known to be effective in oxidizing sulfides to sulfones such as hydrogen peroxide, chromic acid, peracetic acid and like oxidizing agents.

The following examples serve to illustrate the invention:

Preparation of β-isobutylmercaptoacetophenone.

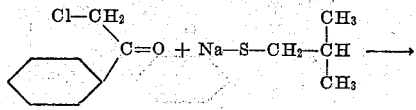

The method of Whitner and Reid (J. A. C. S. 43, 638 (1921)) is used for the preparation of this compound. 30 grams (0.75 mole) of sodium hydroxide are dissolved in 500 cc. of 70% ethanol. To the cooled solution are added 67.5 g. (0.75 mole) of isobutylmercaptan. A clear solution is formed. 115 grams (0.75 mole) of phenacyl chloride are added and the mixture shaken vigorously. The mixture becomes warm and forms two liquid layers. It is then refluxed for about thirty minutes, cooled, and diluted with two volumes of water. The product is extracted twice with small volumes of ether. The extracts are combined, washed with water, saturated salt solution, and dried over anhydrous magnesium sulfate. The ether is distilled off on the steam bath and the residue distilled at reduced pressure. 135 grams of a colorless liquid distilling at 125° C. at 1 mm. is obtained. The yield is 86.5% of the theoretical. $n_D^{20} = 1.5486$.

Preparation of 5-isobutylmercaptomethyl-5-phenylhydantoin.

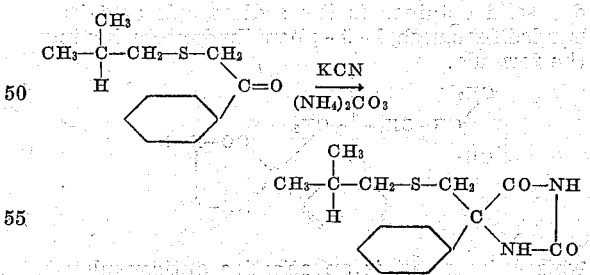

93 grams (0.45 mole) of β-isobutylmercaptoacetophenone, 40 grams of potassium cyanide, and 125 grams of ammonium carbonate are mixed with 1 liter of 70% ethanol in a 2 liter, round-bottom flask. A large bore air condenser is fitted to the flask which is then heated at 55-60° C. for about eight hours. The mixture is then evaporated to about ⅓ of the original volume on the steam bath. The residue is diluted to about ½ of the original volume with water and acidified with concentrated hydrochloric acid (all operations are performed in the hood). An oil precipitates which quickly solidifies. The solid is filtered off and dissolved in 5% sodium hydroxide solution. The resulting solution is charcoaled and filtered. The filtrate is acidified with hydrochloric acid, cooled, and filtered. The solid material is recrystallized from ethanol. The yield is 93 grams of 74.5% of the theoretical. M. P. =147° C. % C and H: Calc'd: C=60.40; H=6.52. Found: C=60.75; H=6.45.

Preparation of 5 - isobutylsulfonomethyl - 5-phenylhydantoin.

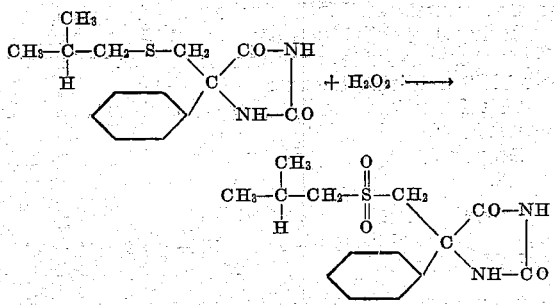

20.8 grams (0.75 mole) of 5-isobutylmercaptomethyl-5-phenylhydantoin are added to a solution of 150 cc. of glacial acetic acid and 38 cc. of acetic anhydride in a small Erlenmeyer flask. 38 cc. of 30% hydrogen peroxide are then added and the mixture shaken gently. A solution quickly forms and gradually warms up. When the temperature of the solution reaches 70-75° C. the flask is placed in an ice water bath in order to keep the temperature below 80° C. When the reaction has slowed down, the flask is removed from the ice water bath and allowed to stand for an hour. The reaction products are transferred to a larger flask and diluted to five volumes with water. The desired hydantoin precipitates as a solid. After cooling to complete the precipitation, the mixture is filtered. The solid is washed with water and recrystallized from 95% ethanol. The yield is 21 grams or 90% of the theoretical. M. P.=221° C. % N: Calc'd., 9.03; found, 8.87.

A quantity of the hydantoin of this example is dissolved in a solution of one equivalent of dilute sodium hydroxide solution. The solution is then treated with charcoal to decolorize and clear up the solution. The mixture with charcoal is filtered and the filtrate evaporated to dryness under reduced pressure at about 50° C. The dry solid obtained is the sodium salt of 5-isobutylsulfonomethyl - 5 - phenylhydantoin having the formula,

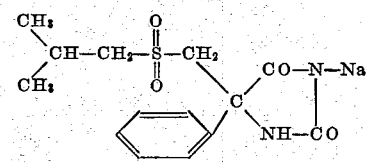

This sodium salt is an effective anticonvulsant when given orally and does not act as a hypnotic. This is an advantage, for example where a person desires to carry on his daily tasks or employment without convulsive seizures and yet being alert mentally and physically.

Other compounds of my invention may be prepared by the same methods illustrated above and using as starting materials, instead of isobutyl mercaptan, other mercaptans, such as heptyl mercaptans or, in general, mercaptans of formula, R—S—H, where R may be a straight, branched, or cyclic alkyl radical or an aryl or aralkyl radical such that the total number of carbon atoms in R is not more than 7.

Further examples of my new hydantoins which I have prepared by methods such as described above for the 5-isobutylsulfonomethyl compound are the following, wherein R stands for the radical R of the general formula,

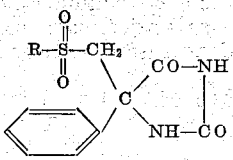

| R | M. P., ° C. |
|---|---|
| Methyl | 234 |
| Ethyl | 240 |
| n-Propyl | 219 |
| Isopropyl | 239 |
| n-Butyl | 195 |
| Isobutyl | 221.5 |
| n-Amyl | 175 |
| n-Hexyl | 177 |
| Cyclohexyl | 261 |
| Phenyl | 277 |
| Benzyl | 210 |

The sulfide intermediates corresponding to each of the above listed sulfones, with melting points in each instance, are given in my copending application.

Other compounds of my invention may be similarly prepared having alkyl radicals such as secondary-butyl, 1-methylbutyl, 1-methylamyl, 1-ethylamyl, or 1-methylhexyl as the substituent represented by R in the general formula. I prefer the branched chain alkyl derivatives.

The sodium salts of the above listed hydantoins are prepared by reacting the hydantoin with sodium hydroxide as set forth in the example given for the isobutyl derivative. Other salts are prepared by using, instead of sodium hydroxide, ammonium hydroxide or an amine to obtain the corresponding salts indicated in the general formula under the symbol M.

The compounds of my invention, either in the form of the hydantoins or their salts, may be administered orally or parenterally, as by injection. They can be suspended or dissolved in inert carrier liquids such as in aqueous solution or in suspension in animal or vegetable oils or fats before administration.

What I claim as my invention is:

1. A compound having the formula,

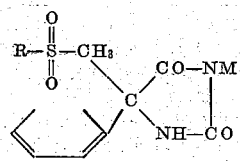

where R is a member of the class alkyl, cycloalkyl, aryl, and aralkyl radicals having not more than 7 carbon atoms, and M is a member of the group consisting of hydrogen and non-toxic salt-forming groups.

2. A compound having the formula,

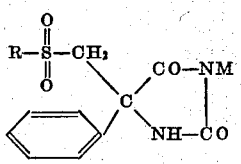

where R is an alkyl radical having not more than 7 carbon atoms and M is a member of the group consisting of hydrogen and non-toxic salt-forming groups.

3. A compound having the formula,

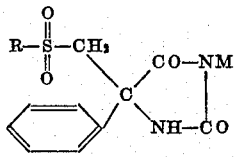

where R is a branched chain alkyl radical having not more than 7 carbon atoms and M is a member of the group consisting of hydrogen and non-toxic salt-forming groups.

4. 5-isobutylsulfonomethyl-5-phenylhydantoin.

5. The sodium salt of 5-isobutylsulfonomethyl-5-phenylhydantoin.

6. Process for obtaining hydantoin compounds which comprises oxidizing a hydantoin of formula

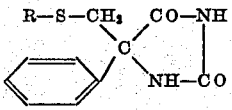

with an oxidizing agent for converting an organic sulfide to the corresponding sulfone, where R is a member of the class alkyl, cycloalkyl, aryl, and aralkyl radicals having not more than 7 carbon atoms.

7. Process for obtaining hydantoin compounds which comprises oxidizing a hydantoin of formula

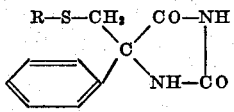

with an oxidizing agent for converting an organic sulfide to the corresponding sulfone, where R is a branched chain alkyl radical having not more than 7 carbon atoms.

8. Process for obtaining hydantoin compounds which comprises oxidizing 5-isobutylmercaptomethyl-5-phenylhydantoin with hydrogen peroxide to convert said hydantoin to 5-isobutylsulfonomethyl-5-phenylhydantoin.

LOREN M. LONG.